(12) United States Patent
Woo et al.

(10) Patent No.: US 11,484,985 B2
(45) Date of Patent: Nov. 1, 2022

(54) PROCESSING APPARATUS

(71) Applicant: DISCO CORPORATION, Tokyo (JP)

(72) Inventors: Junsoo Woo, Tokyo (JP); Toshiyuki Moriya, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 303 days.

(21) Appl. No.: 15/931,874

(22) Filed: May 14, 2020

(65) Prior Publication Data

US 2020/0361055 A1 Nov. 19, 2020

(30) Foreign Application Priority Data

May 16, 2019 (JP) .............................. JP2019-092859

(51) Int. Cl.
   *B24B 37/27* (2012.01)
   *B24B 41/06* (2012.01)
   *B25J 15/06* (2006.01)
   *B25B 11/00* (2006.01)

(52) U.S. Cl.
   CPC ............ *B24B 37/27* (2013.01); *B24B 41/066* (2013.01); *B24B 41/067* (2013.01); *B24B 41/068* (2013.01); *B25B 11/005* (2013.01); *B25J 15/0616* (2013.01)

(58) Field of Classification Search
   CPC .............. B24B 41/066; B24B 41/0067; B24B 41/0068; B24B 37/27; B25B 11/005
   USPC ............................................................. 451/5
   See application file for complete search history.

(56) References Cited

U.S. PATENT DOCUMENTS

| | | | | |
|---|---|---|---|---|
| 6,582,287 | B2 * | 6/2003 | Sasayama | B24B 7/228 451/287 |
| 7,247,080 | B1 * | 7/2007 | Bennett | G05B 19/41875 451/6 |
| 8,579,678 | B2 * | 11/2013 | Omomoto | B24B 37/30 451/365 |
| 2008/0076334 | A1 * | 3/2008 | Yoshida | B24B 7/228 451/177 |
| 2008/0090505 | A1 * | 4/2008 | Yoshida | B24B 7/228 451/413 |

(Continued)

FOREIGN PATENT DOCUMENTS

JP 2007294588 A 11/2007
JP 2015098073 A 5/2015

*Primary Examiner* — Anne M Kozak
*Assistant Examiner* — Jonathan G Santiago Martinez
(74) *Attorney, Agent, or Firm* — Greer Burns & Crain Ltd.

(57) ABSTRACT

A grinding apparatus has a hermetically sealed chamber defined by a portion of a holding surface which extends radially outwardly from a wafer, an outer wall surface of a first annular packing, a lower surface of a plate, and an inner wall surface of a second annular packing. A negative pressure is developed by suction forces applied from the holding surface, allowing the atmospheric pressure to press the plate toward the holding surface and causing the first annular packing to press an outer circumferential portion of the wafer against the holding surface. Since the outer circumferential portion of the wafer is pressed against the holding surface under the suction forces from the holding surface and the atmospheric pressure, the forces pressing the outer circumferential portion of the wafer against the holding surface are increased easily at a low cost without increasing the size and weight of the grinding apparatus.

1 Claim, 7 Drawing Sheets

(56) References Cited

U.S. PATENT DOCUMENTS

| | | | |
|---|---|---|---|
| 2009/0042488 A1* | 2/2009 | Sekiya | B24B 7/228 |
| | | | 451/41 |
| 2009/0176444 A1* | 7/2009 | Higuchi | B24B 9/065 |
| | | | 451/287 |
| 2009/0280722 A1* | 11/2009 | Arai | B24B 1/00 |
| | | | 451/37 |
| 2012/0294690 A1* | 11/2012 | Kawase | B23Q 11/1061 |
| | | | 409/293 |
| 2013/0115861 A1* | 5/2013 | Priewasser | H01L 21/304 |
| | | | 451/54 |
| 2015/0038062 A1* | 2/2015 | Umeda | B23K 26/402 |
| | | | 451/70 |
| 2015/0072507 A1* | 3/2015 | Sekiya | H01L 23/585 |
| | | | 438/462 |
| 2016/0059375 A1* | 3/2016 | Ito | B24B 37/013 |
| | | | 451/6 |
| 2016/0204018 A1* | 7/2016 | Bin | B25J 15/0616 |
| | | | 294/185 |
| 2016/0236325 A1* | 8/2016 | Oshima | B24D 3/06 |
| 2016/0361793 A1* | 12/2016 | Oshima | B24B 37/24 |
| 2018/0050436 A1* | 2/2018 | Yamanaka | B24B 37/107 |
| 2018/0093361 A1* | 4/2018 | Yamanaka | B24B 7/22 |
| 2018/0099373 A1* | 4/2018 | Sekiya | H01L 21/67132 |
| 2018/0099377 A1* | 4/2018 | Sekiya | H01L 21/67092 |
| 2019/0047116 A1* | 2/2019 | Kakefuda | B24B 55/06 |
| 2019/0051532 A1* | 2/2019 | Komatsu | H01L 22/20 |
| 2019/0076990 A1* | 3/2019 | Pekija | B24B 7/04 |
| 2019/0084124 A1* | 3/2019 | Sekiya | B27B 5/325 |
| 2019/0099855 A1* | 4/2019 | Arifuku | H01L 21/30625 |
| 2019/0198357 A1* | 6/2019 | Watanabe | H01L 21/67092 |
| 2019/0206673 A1* | 7/2019 | Watanabe | B24B 53/007 |
| 2019/0283195 A1* | 9/2019 | Terada | B26D 7/2621 |

\* cited by examiner even if the holding surface is not in fluid communication with a suction source. Therefore, positional displacements of the workpiece on the holding surface are reduced.

PROCESSING APPARATUS

BACKGROUND OF THE INVENTION

Field of the Invention

The present invention relates to a processing apparatus.

Description of the Related Art

Generally, a grinding apparatus for grinding workpieces operates by conveying a workpiece to a chuck table, placing the workpiece on a holding surface thereof, and bringing the holding surface into fluid communication with a suction source to hold the workpiece under suction on the holding surface. The workpiece held under suction on the holding surface is ground by grinding stones. A conveying apparatus for conveying workpieces is disclosed in JP 2007-294588A, for example.

The grinding apparatus are occasionally required to grind workpieces whose outer circumferential portions are warped upwardly. In such a case, when a warped workpiece is to be held under suction on the holding surface, a gap is created between the holding surface and the lower surface of the workpiece, resulting in a leakage of suction forces to be applied from the holding surface to the workpiece. The leakage of the suction forces makes it difficult for the holding surface to hold the workpiece under suction thereon.

JP 2015-098073A discloses as one solution a conveying apparatus for conveying a workpiece to the holding surface of a chuck table. The disclosed conveying apparatus includes a suction holder for holding a central region of the workpiece under suction and a presser for pressing an outer circumferential portion of the workpiece. The presser presses the outer circumferential portion of the workpiece against the holding surface, thereby reducing the gap between the holding surface and the lower surface of the outer circumferential portion of the workpiece.

SUMMARY OF THE INVENTION

However, in the case where the force with which the outer circumferential portion of the workpiece is warped is strong, the gap between the holding surface and the lower surface of the outer circumferential portion of the workpiece may not be sufficiently reduced simply when the outer circumferential portion of the workpiece is pressed by the conveying apparatus, possibly resulting in a leakage of suction forces to be applied from the holding surface to the workpiece.

One solution would be to increase the pressing force with which the outer circumferential portion of the workpiece is pressed. However, increasing the pressing force would require an actuator, i.e., an electric motor, for actuating the conveying apparatus, or the conveying apparatus itself, to be large in size, and hence would be uneconomical.

It is therefore an object of the present invention to provide a processing apparatus which is capable of increasing the pressing force with which to press the outer circumferential portion of a workpiece to be processed, while preventing the processing apparatus itself from increasing in size.

In accordance with an aspect of the present invention, there is provided a processing apparatus including a chuck table having a holding surface for holding a circular workpiece thereon, processing means for processing the workpiece held on the holding surface, temporary placing means for temporarily placing the workpiece thereon, a conveying mechanism for conveying the workpiece temporarily placed on the temporary placing means to the chuck table, and a control unit. The conveying mechanism includes a suction pad having a suction surface for holding a central region of the workpiece under suction, a plate centrally supporting the suction pad and capable of lifting and lowering the suction pad in directions perpendicular to the suction surface, a first annular packing disposed on a lower surface of the plate around a center of the lower surface thereof, a second annular packing disposed around the first annular packing on the lower surface of the plate in concentric relation to the first annular packing, an arm having a support member supporting the plate, and lifting and lowering means for lifting and lowering the arm in the directions perpendicular to the suction surface of the suction pad. The control unit includes a first control section that, while the suction pad is holding under suction the workpiece temporarily placed on the temporary placing means, controls the lifting and lowering means to lower the plate together with the arm from above the holding surface to bring the workpiece into contact with the holding surface, to bring the first annular packing into contact with an upper surface of an outer circumferential portion of the workpiece, and to bring the second annular packing into contact with a portion of the holding surface which extends radially outwardly from the wafer, for thereby producing an annular space as a hermetically sealed chamber jointly defined by the portion of the holding surface which extends radially outwardly from the wafer, an outer wall surface of the first annular packing, the lower surface of the plate, and an inner wall surface of the second annular packing, a second control section that, while the annular space is being produced as the hermetically sealed chamber, opens a suction valve disposed in a suction passageway that provides fluid communication between the holding surface and a suction source, to develop a negative pressure in the annular space for thereby allowing the atmospheric pressure to press the plate toward the holding surface, and to cause the first annular packing to press the outer circumferential portion of the workpiece against the holding surface for thereby allowing the holding surface to attract and hold the workpiece under suction on the holding surface, and a third control section that, after the workpiece has been held under suction on the holding surface, opens an air valve disposed in an air supply passageway that provides fluid communication between the suction surface of the suction pad and an air supply source, to space the workpiece away from the suction surface. The support member has an on-off valve for closing the annular space as the hermetically sealed chamber when the plate is lowered together with the arm and for venting the annular space to the atmosphere when the arm is lifted while the annular space is being produced as the hermetically sealed chamber.

The processing apparatus according to the present invention presses the outer circumferential portion of the workpiece against the holding surface under the suction forces from the holding surface and the atmospheric pressure. Therefore, the forces with which to press the outer circumferential portion of the wafer against the holding surface are increased easily at a low cost without involving an increase in the size and weight of the grinding apparatus.

Furthermore, since the processing apparatus according to the present invention uses the suction forces from the holding surface and the atmospheric pressure to press the outer circumferential portion of the workpiece against the holding surface, even if the holding surface has its gradient changed to match the gradient of the grinding unit, the workpiece can be pressed against the holding surface according to the changed gradient thereof. Therefore, the holding surface can easily hold the workpiece under suction thereon.

The above and other objects, features and advantages of the present invention and the manner of realizing them will become more apparent, and the invention itself will best be understood from a study of the following description and an appended claim with reference to the attached drawings showing a preferred embodiment of the invention.

DETAILED DESCRIPTION OF THE PREFERRED EMBODIMENT

Figure 1:
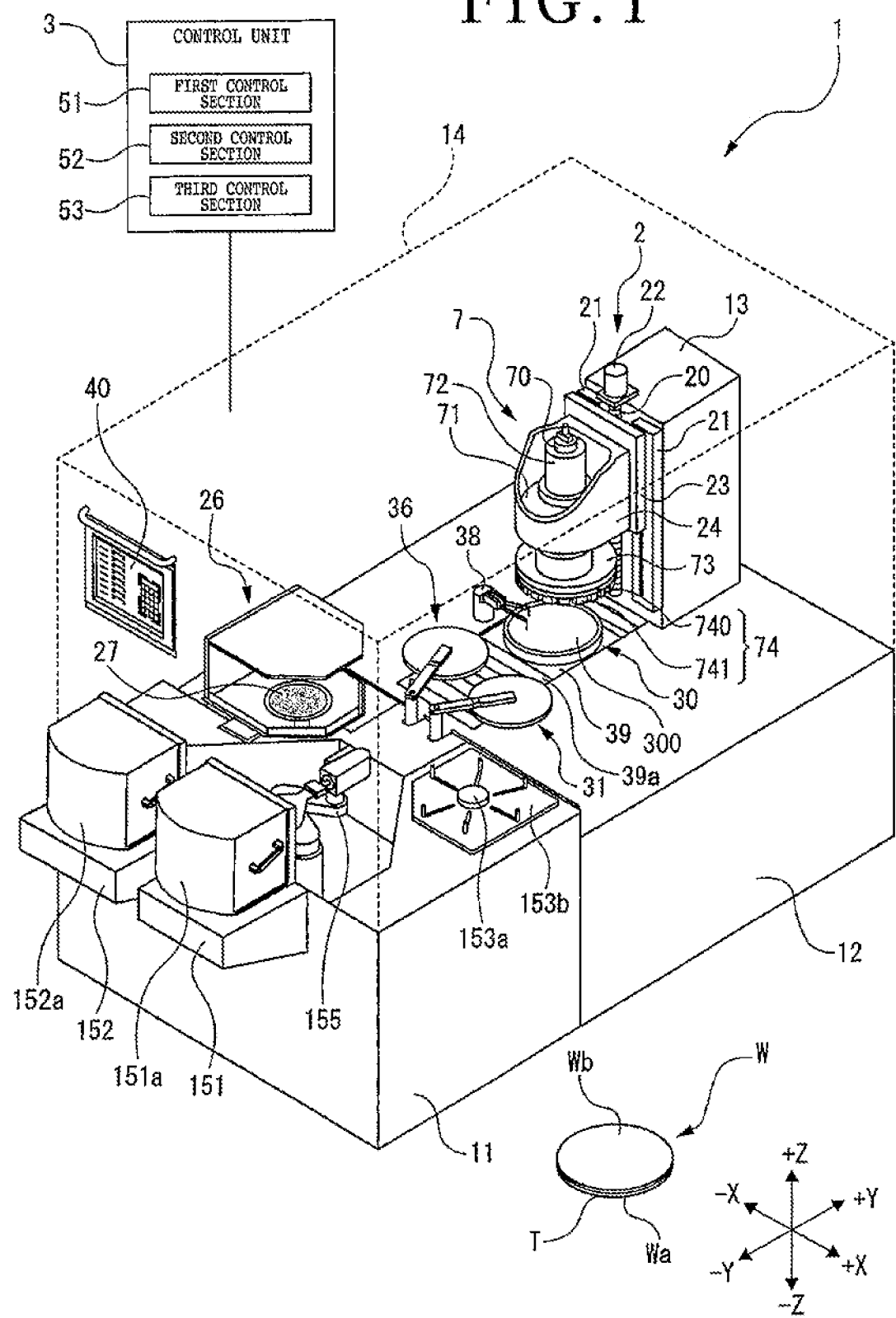
FIG. 1 is a perspective view of a grinding apparatus.

A grinding apparatus 1, illustrated in FIG. 1, according to a preferred embodiment of the present invention represents a processing apparatus according to the present invention. The grinding apparatus 1 is arranged to fully automatically perform a series of operations including a loading step, a grinding step, a cleaning step, and an unloading step on a wafer W that is illustrated as an example of disk-shaped workpiece.

The wafer W illustrated in FIG. 1 is exemplified by a circular semiconductor wafer, for example. The wafer W has a face side Wa that faces downwardly in FIG. 1 and holds a plurality of devices formed thereon that are protected by a protective tape T applied to the face side Wa. The wafer W has a reverse side Wb facing upwardly that represents a processed surface on which the grinding step is to be performed.

The grinding apparatus 1 includes a first apparatus base 11 that is substantially rectangular in shape, a second apparatus base 12 that is substantially rectangular in shape and is joined to a rear end (facing in a +Y direction) of the first apparatus base 11, a column 13 mounted on and extending upwardly from the second apparatus base 12, and a housing 14 covering the first apparatus base 11 and the second apparatus base 12.

A first cassette stage 151 and a second cassette stage 152 are mounted on a front surface (facing in a −Y direction) of the first apparatus base 11. A first cassette 151a that accommodates wafers W to be processed therein is placed on the first cassette stage 151. A second cassette 152a that accommodates processed wafers W therein is placed on the second cassette stage 152. Each of the first cassette 151a and the second cassette 152a has a plurality of shelves disposed therein for holding wafers W respectively thereon.

The first cassette 151a has an opening (not illustrated) defined in a rear wall thereof and facing in the +Y direction. The second cassette 152a also has an opening (not illustrated) defined in a rear wall thereof and facing in the +Y direction. A robot 155 is disposed on the first apparatus base 11 behind the opening in the first cassette 151a in the +Y direction. The robot 155 operates to load a processed wafer W into the second cassette 152a through its opening. The robot 155 also operates to unload a wafer W to be processed from the first cassette 151a through its opening and places the unloaded wafer W on a temporary placing table 153a.

The temporary placing table 153a, which represents an example of temporary placing means, is disposed in a position adjacent to the robot 155. The temporary placing table 153a is combined with positioning means 153b. The positioning means 153b positions, i.e., centers, a wafer W placed on the temporary placing table 153a in a predetermined position using positioning pins that are movable radially inwardly and outwardly.

A loading mechanism 31 is mounted on the first apparatus base 11 at a position adjacent to the temporary placing table 153a. The loading mechanism 31 represents an example of a conveying mechanism. The loading mechanism 31 holds the wafer W temporarily placed on the temporary placing table 153a under suction, conveys the wafer W to a chuck table 30, and places the wafer W on a holding surface 300 of the chuck table 30.

The chuck table 30 has the holding surface 300 for attracting the wafer W under suction. The holding surface 300 is held in fluid communication with a suction source (not illustrated) and holds the wafer W through the protective tape T under suction forces applied from the suction source. The chuck table 30 is rotatable about a central axis extending in Z-axis directions through the center of the holding surface 300 while the wafer W is being held on the holding surface 300.

The chuck table 30 is surrounded by a cover 39 disposed therearound. A bellows cover 39a that is extensible and contractible in Y-axis directions, i.e., the +Y direction and the −Y direction, is coupled to the cover 39. The cover 39 and the bellows cover 39a are disposed above Y-axis moving means (not illustrated) housed in the second apparatus base 12. The chuck table 30 is reciprocably movable in the Y-axis directions by the Y-axis moving means.

The column 13 is erected on the second apparatus base 12 behind the chuck table 30 in the +Y direction. The column 13 supports on a front surface thereof a grinding unit 7 for grinding the wafer W on the chuck table 30 and a grind feeding mechanism 2 for moving the grinding unit 7 in the Z-axis directions as grind feeding directions.

The grind feeding mechanism 2 includes a pair of Z-axis guide rails 21 parallel to the Z-axis directions, a Z-axis moving table 23 slidable on and along the Z-axis guide rails 21, a Z-axis ball screw 20 extending parallel to the Z-axis guide rails 21, a Z-axis servomotor 22, and a holder 24 mounted on a front surface, i.e., a face side, of the Z-axis moving table 23. The holder 24 holds the grinding unit 7 thereon.

The Z-axis moving table 23 is slidably mounted on the Z-axis guide rails 21. A nut (not illustrated) is fixed to a rear surface, i.e., a reverse side, of the Z-axis moving table 23. The Z-axis ball screw 20 is threaded through the nut. The Z-axis servomotor 22 is coupled to an end of the Z-axis ball screw 20.

The grind feeding mechanism 2 operates as follows. When the Z-axis servomotor 22 is energized, it rotates the Z-axis ball screw 20 about its own central axis, causing the Z-axis moving table 23 to move in one of the Z-axis directions, i.e., a +Z direction or a −Z direction, along the Z-axis guide rails 21. The holder 24 mounted on the Z-axis moving table 23 and hence the grinding unit 7 held on the holder 24 are moved in unison with the Z-axis moving table 23 in the same Z-axis direction.

The grinding unit 7 represents an example of processing means. The grinding unit 7 includes a spindle housing 71 fixed to the holder 24, a spindle 70 rotatably held by the spindle housing 71, an electric motor 72 for rotating the spindle 70, a wheel mount 73 mounted on the lower end of the spindle 70, and a grinding wheel 74 supported on the wheel mount 73.

The spindle housing 71 that is fixed to the holder 24 extends in the Z-axis directions. The spindle 70 extends in the Z-axis directions perpendicularly to the holding surface 300 of the chuck table 30, and is rotatably supported in the spindle housing 71.

The electric motor 72 is coupled to the upper end of the spindle 70. The electric motor 72 rotates the spindle 70 about its own central axis that extends in the Z-axis directions. The wheel mount 73 is of a disk shape fixed to the lower end, i.e., the distal end, of the spindle 70. The wheel mount 73 supports the grinding wheel 74 on its lower surface.

The grinding wheel 74 is of substantially the same diameter as the wheel mount 73. The grinding wheel 74 includes an annular wheel base, or an annular base, 740 made of a metal material such as stainless steel or the like. An annular array of grinding stones 741 are fixed to a lower surface of the wheel base 740 fully along an outer circumferential portion thereof. The grinding stones 741 grind the reverse side Wb of the wafer W held on the chuck table 30.

A thickness measuring unit 38 is disposed in a position adjacent to the chuck table 30. The thickness measuring unit 38 measures the thickness of the wafer W on the chuck table 30 in contact therewith while the wafer W is being ground by the grinding unit 7.

After the wafer W has been ground by the grinding unit 7, the wafer W is unloaded from the chuck table 30 by an unloading mechanism 36. Specifically, the unloading mechanism 36 holds under suction the wafer W placed on the chuck table 30, unloads the wafer W from the chuck table 30, and conveys the wafer W to a spinner table 27 of a single-wafer spinner cleaning unit 26.

The spinner cleaning unit 26 includes, in addition to the spinner table 27 for holding the wafer W thereon, various nozzles (not illustrated) for ejecting cleaning water and drying air toward the spinner table 27.

In the spinner cleaning unit 26, the spinner table 27 that is holding the wafer W is lowered into the first apparatus base 11. In the first apparatus base 11, cleaning water is ejected toward the reverse side Wb of the wafer W, and the wafer W is cleaned while in rotation. Thereafter, drying air is ejected toward the wafer W, drying the wafer W. After the wafer W has been cleaned by the spinner cleaning unit 26, the spinner table 27 is lifted and the wafer W is loaded from the spinner table 27 into the second cassette 152a by the robot 155.

A touch panel 40 is mounted on a side surface of the housing 14 that faces in the −Y direction. The touch panel 40 displays various items of information representing the processing status of the grinding apparatus 1 and processing conditions regarding the processing of the wafer W by the grinding apparatus 1. The touch panel 40 is also used to enter various items of information representing processing conditions or the like. Therefore, the touch panel 40 functions as input means for entering information and also as output means for displaying entered information and the processing status.

The grinding apparatus 1 also includes, within the housing 14, a control unit 3 for controlling the components of the grinding apparatus 1. The control unit 3 controls the components of the grinding apparatus 1 to process the wafer W as desired by the operator of the grinding apparatus 1. The control unit 3 also controls the loading mechanism 31 to convey wafers W to the holding surface 300 of the chuck table 30.

Figure 2:
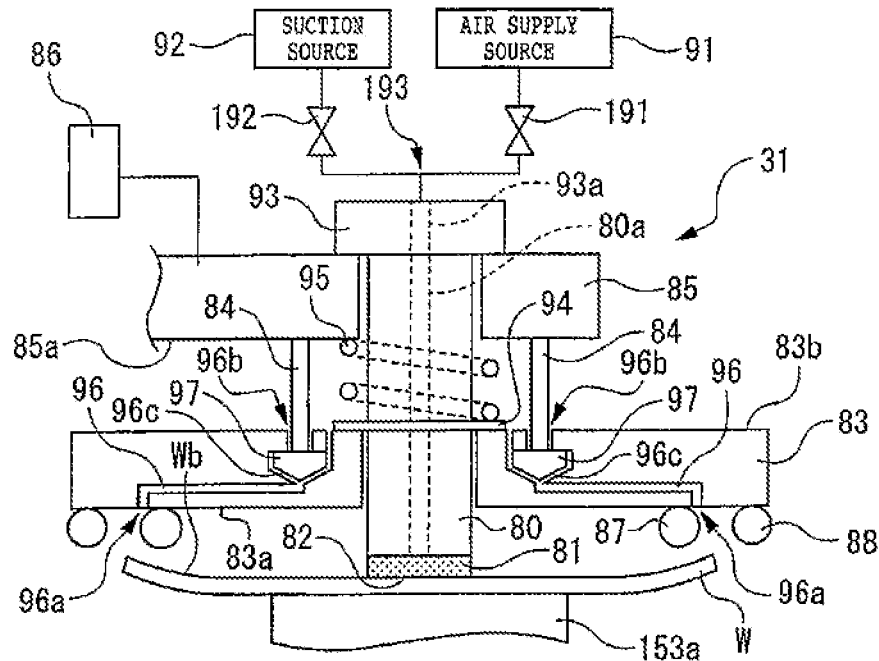
FIG. 2 is a cross-sectional view of a loading mechanism of the grinding apparatus.

Next, the loading mechanism 31 that represents features of the grinding apparatus 1 according to the present embodiment will be described below. As illustrated in FIG. 2, the loading mechanism 31 includes a suction pad 81 having a suction surface 82, a plate 83 centrally supporting the suction pad 81, a plurality of support members 84 supporting the plate 83, an arm 85 having the support members 84, and lifting and lowering means 86 for lifting and lowering the arm 85.

The loading mechanism 31 also includes, on a lower surface 83a of the plate 83, a first annular packing 87 disposed around the center of the lower surface 83a and a second annular packing 88 disposed around the first annular packing 87 on the lower surface 83a of the plate 83 in concentric relation to the first annular packing 87. The suction surface 82 of the suction pad 81 is used to hold a central region of the wafer W under suction. The suction pad 81 is disposed on the lower end of a vertical shaft 80.

The shaft 80 extends through a central region of the plate 83 vertically in directions perpendicular to the suction surface 82 of the suction pad 81. The plate 83 supports the suction pad 81 through the shaft 80 such that the suction pad 81 can be lifted and lowered in the directions perpendicular to the suction surface 82 of the suction pad 81. The shaft 80 also extends through the arm 85 vertically in directions perpendicular to the suction surface 82 above the plate 83.

The shaft 80 has an upper end extending upwardly through the arm 85 and joined to an upper end plate 93 that is larger in diameter than the shaft 80. The upper end plate 93 prevents the shaft 80 from dropping down from the arm 85.

A fixing plate 94 that is larger in diameter than the shaft 80 is mounted on a substantially central region of the shaft 80. The fixing plate 94 is fitted over the shaft 80 at a position between a lower surface 85a of the arm 85 and an upper surface 83b of the plate 83. A helical spring 95 is disposed around the shaft 98 so as to act between an upper surface of the fixing plate 94 and the lower surface 85a of the arm 85. The helical spring 95 is resiliently expansible and compressible in the directions along which the shaft 80 extends, i.e., in the directions perpendicular to the suction surface 82 of the suction pad 81.

The shaft 80 has a through passageway 80a defined axially therethrough that interconnects the upper end of the shaft 80 and the suction pad 81. The through passageway 80a is capable of fluid communication with either one of an air supply source 91 and a suction source 92 via an opening 93a in the upper end plate 93 and either one of an air valve 191 and a suction valve 192 in a fluid communication passageway 193. The fluid communication passageway 193 represents an example of an air supply passage.

The first annular packing 87 and the second annular packing 88 disposed concentrically with the first annular packing 87, both referred to above, are disposed on the lower surface 83a of the plate 83 that supports the shaft 80. Plate fluid communication passageways 96 are defined in the plate 83. The plate fluid communication passageways 96 provide fluid communication between areas of the lower surface 83a of the plate 83 that lie between the first annular packing 87 and the second annular packing 88 and the upper surface 83b of the plate 83.

The plate 83 has lower surface openings 96a defined in the areas of the lower surface 83a thereof between the first annular packing 87 and the second annular packing 88. The lower surface openings 96a represent openings of the plate fluid communication passageways 96 that are open at the lower surface 83a. The plate 83 also has upper surface openings 96b defined in the upper surface 83b thereof. The upper surface openings 96b represent openings of the plate fluid communication passageways 96 that are open at the upper surface 83b.

The support members 84 that support the plate 83 are disposed on the lower surface 85a of the arm 85. The support members 84 have lower ends on which there are mounted on-off valves 97 that are larger in diameter than the support members 84. The on-off valves 97 are vertically movably housed in respective spaces 96c defined as enlarged portions of the plate fluid communication passageways 96 in the plate 83.

The on-off valves 97 that are vertically movable in a predetermined range defined by the spaces 96c are retained in the plate 83 against dislodgement from the spaces 96c, i.e., the plate fluid communication passageways 96. The on-off valves 97 allow the support members 84 to support the plate 83.

When the on-off valves 97 are moved downwardly with respect to the plate 83, the on-off valves 97 abut against the lower ends of the spaces 96c, closing or blocking the plate fluid communication passageways 96. On the other hand, when the on-off valves 97 are moved upwardly with respect to the plate 83, the on-off valves 97 abut against the upper ends of the spaces 96c, opening the plate fluid communication passageways 96.

The arm 85 that is combined with the support members 84 with the on-off valves 97 mounted thereon can move the plate 83 in horizontal directions, i.e., directions parallel to the suction surface 82 of the suction pad 81. In addition, the arm 85 is vertically movable with the plate 83 by the lifting and lowering means 86. In other words, the lifting and lowering means 86 is capable of moving the arm 85 with the plate 83 vertically in the directions perpendicular to the suction surface 82 of the suction pad 81.

As described above, the loading mechanism 31 thus constructed holds under suction the wafer W temporarily placed on the temporary placing table 153a and places the wafer W onto the holding surface 300 of the chuck table 30. Such operation of the loading mechanism 31 is controlled by the control unit 3 that has a first control section 51, a second control section 52, and a third control section 53 illustrated in FIG. 1.

Operation of the loading mechanism 31 under the control of the control unit 3 will be described hereinbelow. According to the present embodiment, as illustrated in FIG. 2, the wafer W is curved such that the reverse side Wb thereof is recessed, with an outer circumferential portion thereof being warped upwardly.

As illustrated in FIG. 2, the control unit 3 controls the arm 85 and the lifting and lowering means 86 of the loading mechanism 31 to place the plate 83 above the temporary placing table 153a. Then, the control unit 3 controls the lifting and lowering means 86 to lower the plate 83 until the suction surface 82 of the suction pad 81 on the lower end of the shaft 80 supported by the plate 83 abuts against the central region of the wafer W.

Figure 3:
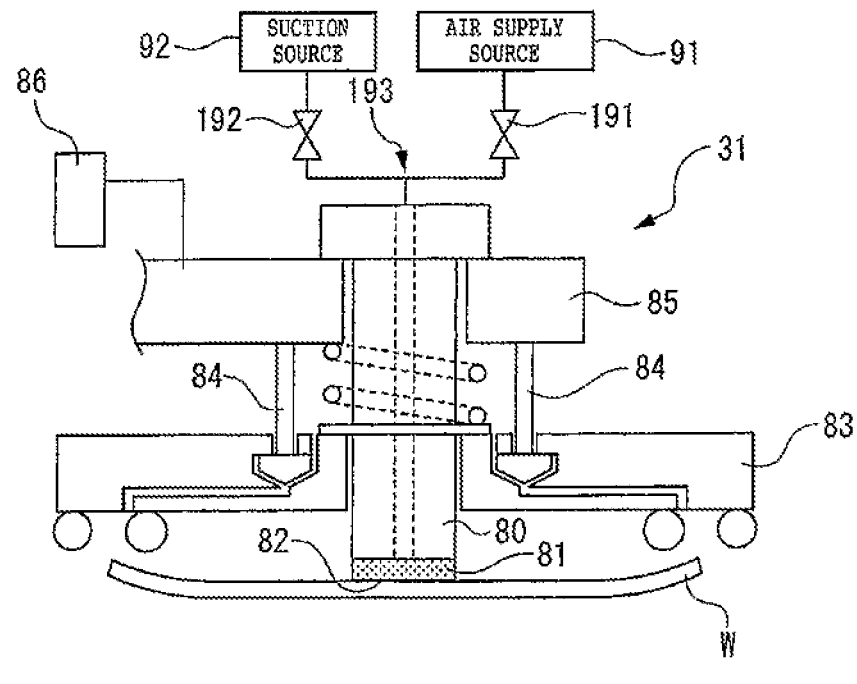
FIG. 3 is a cross-sectional view illustrating the manner in which a wafer is held by a suction pad.
Figure 3:
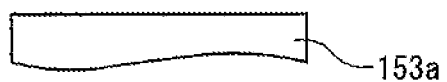

Furthermore, the control unit 3 closes the air valve 191 and opens the suction valve 192, bringing the suction surface 82 of the suction pad 81 into fluid communication with the suction source 92. As illustrated in FIG. 3, the wafer W is now held under suction by the suction pad 81 of the loading mechanism 31 and spaced from the temporary placing table 153a.

Figure 4:
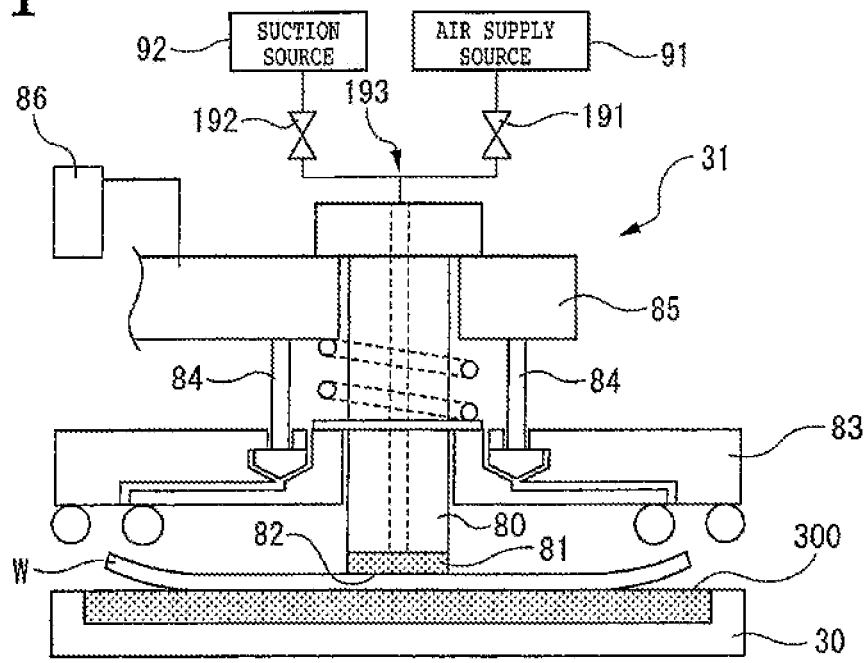
FIG. 4 is a cross-sectional view illustrating the manner in which the wafer is placed on the holding surface of a chuck table.

Then, the first control section 51 of the control unit 3 controls the arm 85 and the lifting and lowering means 86 to place the plate 83 above the holding surface 300 of the chuck table 30. The first control section 51 controls the lifting and lowering means 86 to lower the arm 85 together with the plate 83 from above the holding surface 300. In this manner, the first control section 51 brings a central region of the wafer W into contact with the holding surface 300, as illustrated in FIG. 4.

Figure 5:
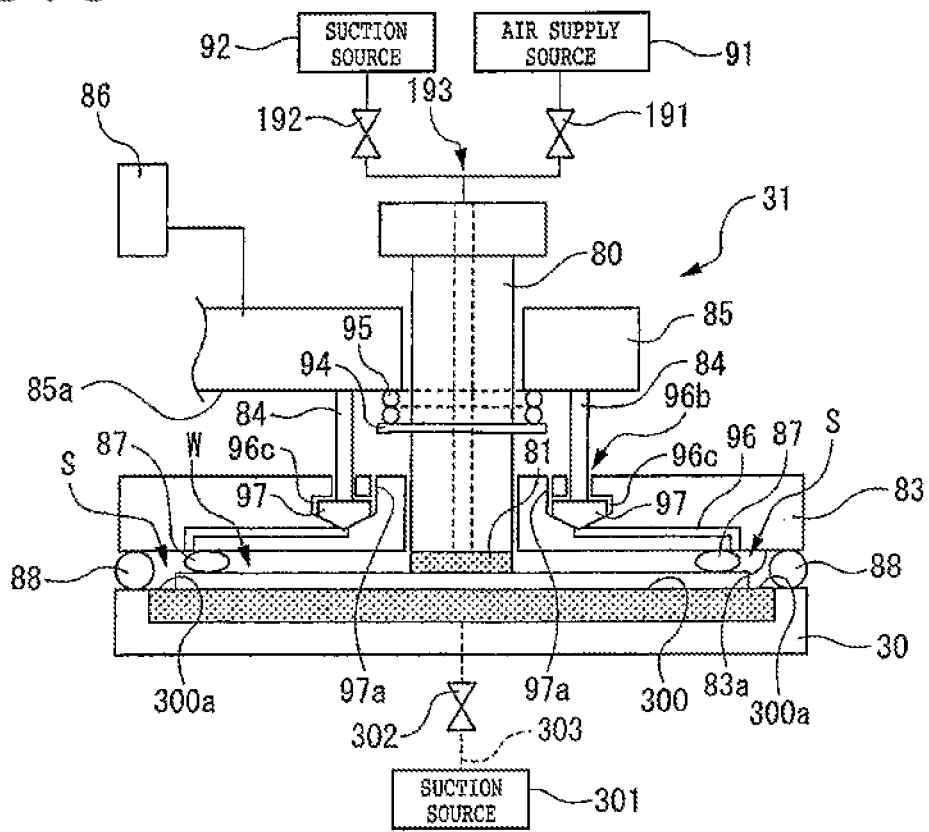
FIG. 5 is a cross-sectional view illustrating the manner in which the wafer is attracted to and held on the holding surface.

Moreover, the first control section 51 controls the lifting and lowering means 86 to lower and press the plate 83 together with the arm 85 toward the holding surface 300. Now, as illustrated in FIG. 5, the helical spring 95 disposed between the upper surface of the fixing plate 94 and the lower surface 85a of the arm 85 is compressed. The first annular packing 87 on the lower surface 83a of the plate 83 contacts the upper surface of the upwardly warped outer circumferential portion of the wafer W, and the second annular packing 88 contacts a portion 300a of the holding surface 300 which extends radially outwardly from the wafer W.

In this manner, as illustrated in FIG. 5, the first control section 51 produces an annular space S jointly defined by the portion 300a of the holding surface 300 which extends radially outwardly from the wafer W, an outer wall surface of the first annular packing 87, the lower surface 83a of the plate 83, and an inner wall surface of the second annular packing 88.

At this time, the on-off valves 97 on the distal ends of the support members 84 on the arms 85 abut against the lower ends of the spaces 96c of the plate fluid communication passageways 96 in the plate 83, thereby closing or blocking the plate fluid communication passageways 96. The annular space S now becomes a hermetically sealed chamber.

The on-off valves 97 are thus arranged to produce the annular space S as the hermetically sealed chamber when the plate 83 is lowered with the arm 85. As illustrated in FIG. 5, the holding surface 300 is connected to a suction source 301 via a suction passageway 303 and a suction valve 302.

With the annular space S acting as the hermetically sealed chamber, the second control section 52 opens the suction valve 302 to bring the holding surface 300 into fluid communication with the suction source 301. As described above, the portion 300a of the holding surface 300 which extends radially outwardly from the wafer W partly defines the annular space S. Therefore, when the holding surface 300 is brought into fluid communication with the suction source 301, suction forces applied from the suction source 301 to the holding surface 300 act in the annular space S, developing a negative pressure in the annular space S acting as the hermetically sealed chamber.

As a result, the plate 83 is pressed toward the holding surface 300 under the atmospheric pressure. Consequently, the upwardly warped outer circumferential portion of the wafer W is pressed against the holding surface 300 by the first annular packing 87 on the plate 83. The wafer W is now attracted and held in its entirety under suction on the holding surface 300.

Figure 6:
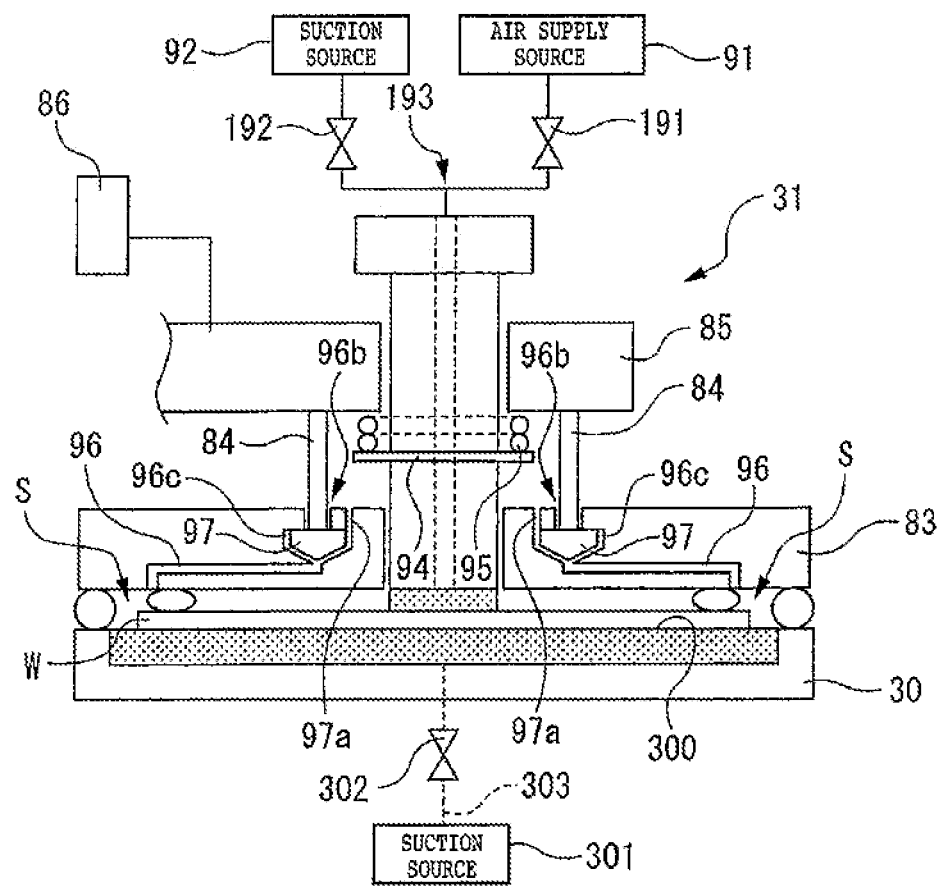
FIG. 6 is a cross-sectional view illustrating the manner in which an arm is lifted after the wafer has been attracted to and held on the holding surface.

After the wafer W has been held under suction on the holding surface 300, the control unit 3 controls the lifting and lowering means 86 to lift the arm 85 as illustrated in FIG. 6. The on-off valves 97 on the distal ends of the support members 84 on the arms 85 are moved upwardly and abut against the upper ends of the spaces 96c of the plate fluid communication passageways 96 in the plate 83, thereby opening the plate fluid communication passageways 96. The hermetically sealed chamber is now broken, venting the annular space S to the atmosphere. The on-off valves 97 are thus arranged to vent the annular space S to the atmosphere when the arm 85 is lifted while the annular space S is acting as the hermetically sealed chamber.

Figure 8:
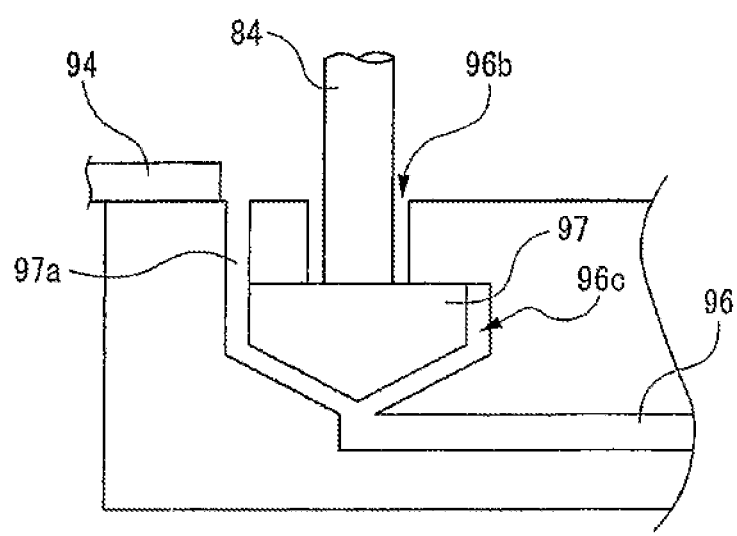
FIG. 8 is an enlarged fragmentary cross-sectional view of an on-off valve and nearby components.
Figure 9:
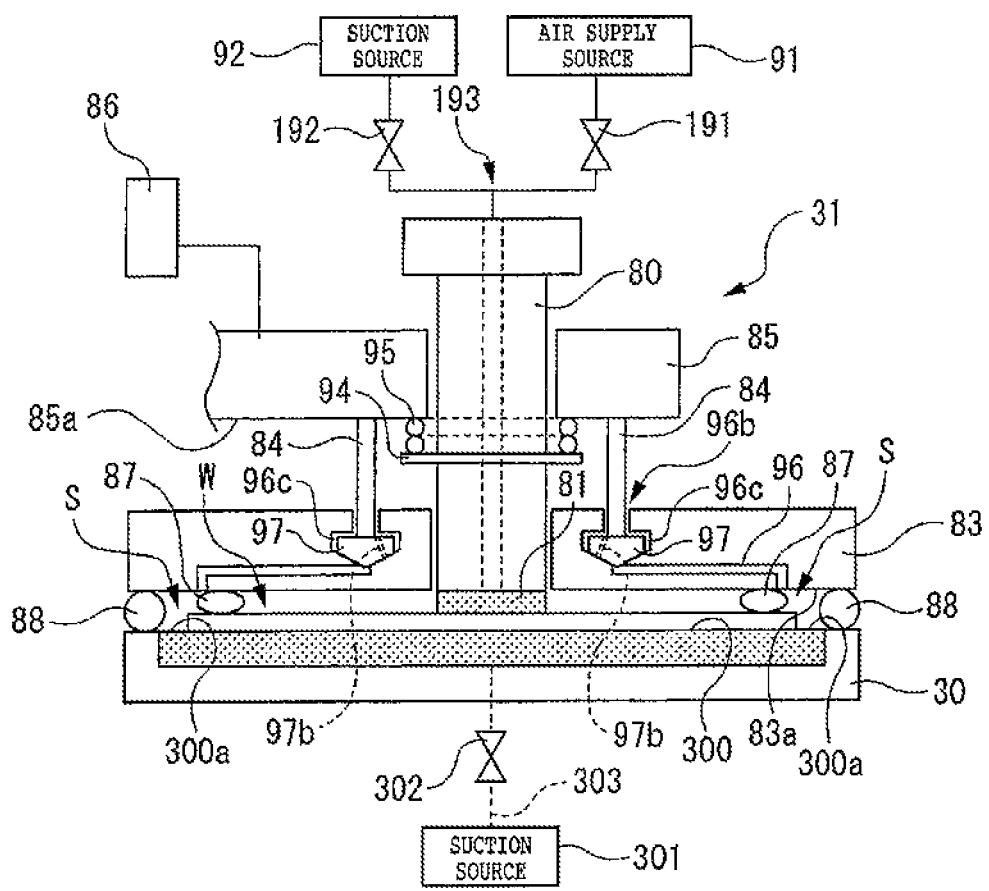
FIG. 9 is a cross-sectional view of another structure for opening and closing plate fluid channels with on-off valves.
Figure 10:
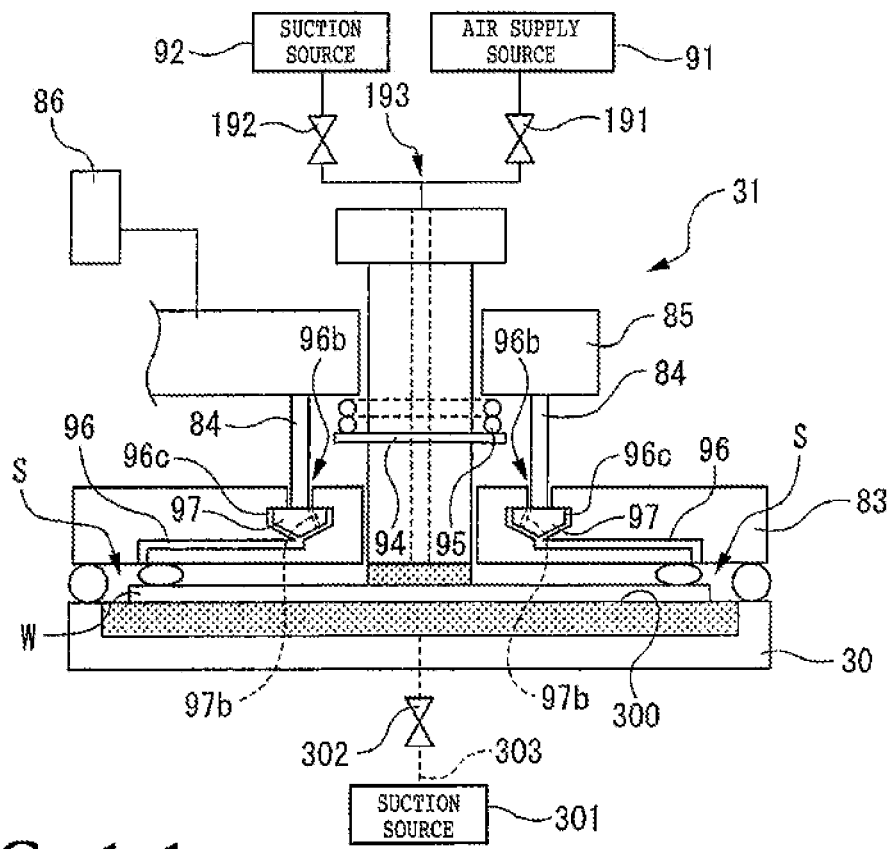
FIG. 10 is a cross-sectional view of the other structure for opening and closing the plate fluid channels with the on-off valves.
Figure 11:
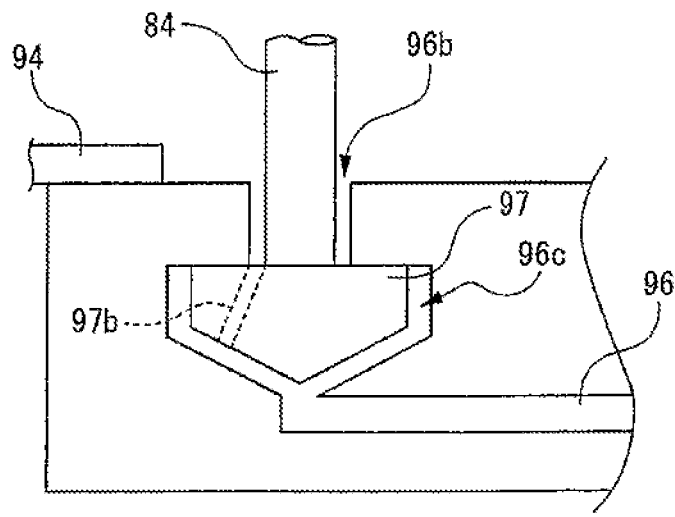
FIG. 11 is an enlarged fragmentary cross-sectional view of one of the on-off valves illustrated in FIG. 10 and nearby components.

When the on-off valves 97 are moved upwardly in the spaces 96c, the plate fluid communication passageways 96 are opened by a structure including plate connection passageways 97a as illustrated in FIGS. 5 and 6, and FIG. 8 which illustrates the on-off valve 97 and its nearby components at an enlarged scale. The plate connection passageways 97a provide fluid communication between the spaces 96c and the upper surface 83b of the plate 83 when the on-off valves 97 are unseated off the lower surfaces of the spaces 96c. Alternatively, as illustrated in FIGS. 9 and 10, and FIG. 11 which illustrates the on-off valve 97 and its nearby components at an enlarged scale, when the on-off valves 97 are unseated off the lower surfaces of the spaces 96c and seated on the upper surfaces of the spaces 96c, the plate fluid communication passageways 96 are opened by a structure including valve connection passageways 97b defined in the respective on-off valves 97. The valve connection passageways 97b provide fluid communication between the upper and lower surfaces of the on-off valves 97. The valve connection passageways 97b are closed when the on-off valves 97 are seated on the lower surfaces of the spaces 96c.

Figure 7:
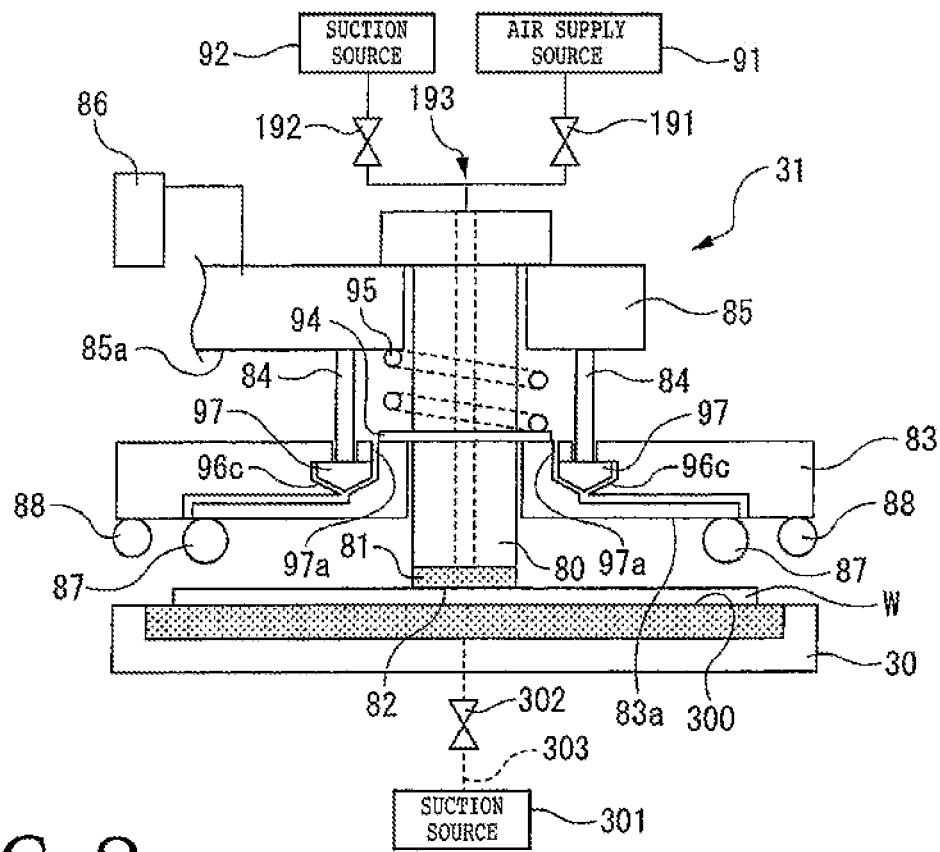
FIG. 7 is a cross-sectional view illustrating the manner in which a plate is spaced from the chuck table by the lifted arm.

Thereafter, the control unit 3 controls the lifting and lowering means 86 to further lift the arm 85. As illustrated in FIG. 7, the helical spring 95 disposed between the upper surface of the fixing plate 94 and the lower surface 85a of the arm 85 is now expanded.

The first annular packing 87 on the lower surface 83a of the plate 83 is spaced upwardly from the upper surface of the outer circumferential portion of the wafer W, and the second annular packing 88 is spaced upwardly from the holding surface 300.

Thereafter, the third control section 53 of the control unit 3 closes the suction valve 192 and opens the air valve 191 in the fluid communication passageway 193. The suction surface 82 of the suction pad 81 is brought into fluid communication with the air supply source 91, and is supplied with air from the air supply source 91. As a consequence, the wafer W is released from the suction surface 82.

In the grinding apparatus 1, as described above, the first control section 51 produces the annular space S to act as the hermetically sealed chamber jointly defined by the portion 300a of the holding surface 300 which extends radially outwardly from the wafer W, the outer wall surface of the first annular packing 87, the lower surface 83a of the plate 83, and the inner wall surface of the second annular packing 88. Furthermore, the second control section 52 develops a negative pressure in the annular space S due to the suction forces from the holding surface 300, allowing the atmospheric pressure to press the plate 83 toward the holding surface 300 to cause the first annular packing 87 to press the outer circumferential surface of the wafer W against the holding surface 300. Consequently, even though the wafer W is curved or warped in its outer circumferential portion, the wafer W can appropriately be held under suction on the holding surface 300.

Moreover, the grinding apparatus 1 presses the outer circumferential portion of the wafer W against the holding surface 300 under the suction forces from the holding surface 300 and the atmospheric pressure. Accordingly, the forces with which to press the outer circumferential portion of the wafer W against the holding surface 300 are increased easily at a low cost without involving an increase in the size and weight of the grinding apparatus 1.

In addition, since the grinding apparatus 1 uses the suction forces from the holding surface 300 and the atmospheric pressure to press the outer circumferential portion of the wafer W against the holding surface 300, even if the holding surface 300 has its gradient changed to match the gradient of the grinding unit 7, the wafer W can be pressed against the holding surface 300 according to the changed gradient thereof. Therefore, the holding surface 300 can easily hold the wafer W under suction thereon.

According to the present embodiment, the grinding apparatus 1 is illustrated as an example of the processing apparatus incorporating the loading mechanism 31. However, the loading mechanism 31 may be incorporated in any of various other processing apparatuses, such as a polishing apparatus, insofar as they are of the type in which a workpiece is attracted and held under suction on the holding surface of a chuck table thereof.

The present invention is not limited to the details of the above described preferred embodiment. The scope of the invention is defined by the appended claim and all changes and modifications as fall within the equivalence of the scope of the claim are therefore to be embraced by the invention.

What is claimed is:
1. A processing apparatus comprising:
   a chuck table having a holding surface for holding a circular workpiece thereon;
   processing means for processing the workpiece held on the holding surface;
   temporary placing means for temporarily placing the workpiece thereon;
   a conveying mechanism for conveying the workpiece temporarily placed on the temporary placing means to the chuck table; and
   a control unit, wherein
   the conveying mechanism includes:
      a suction pad having a suction surface for holding a central region of the workpiece under suction,
      a plate centrally supporting the suction pad and capable of lifting and lowering the suction pad in directions perpendicular to the suction surface,
      a first annular packing disposed on a lower surface of the plate around a center of the lower surface thereof,
      a second annular packing disposed around the first annular packing on the lower surface of the plate in concentric relation to the first annular packing, an arm having a support member supporting the plate and being configured to be lifted and lowered in the directions perpendicular to the suction surface of the suction pad, and the control unit includes:
- a first control section that, while the suction pad is holding under suction the workpiece temporarily placed on the temporary placing means, controls the lowering of the plate together with the arm from above the holding surface to bring the workpiece into contact with the holding surface, to bring the first annular packing into contact with an upper surface of an outer circumferential portion of the workpiece, and to bring the second annular packing into contact with a portion of the holding surface which extends radially outwardly from the wafer, for thereby producing an annular space as a hermetically sealed chamber jointly defined by the portion of the holding surface which extends radially outwardly from the wafer, an outer wall surface of the first annular packing, the lower surface of the plate, and an inner wall surface of the second annular packing,
- a second control section that, while the annular space is being produced as the hermetically sealed chamber, opens a suction valve disposed in a suction passageway that provides fluid communication between the holding surface and a suction source, to develop a negative pressure in the annular space for thereby allowing the atmospheric pressure to press the plate toward the holding surface, and to cause the first annular packing to press the outer circumferential portion of the workpiece against the holding surface for thereby allowing the holding surface to attract and hold the workpiece under suction on the holding surface, and
- a third control section that, after the workpiece has been held under suction on the holding surface, opens an air valve disposed in an air supply passageway that provides fluid communication between the suction surface of the suction pad and an air supply source, to space the workpiece away from the suction surface, and the support member has an on-off valve for closing the annular space as the hermetically sealed chamber when the plate is lowered together with the arm and for venting the annular space to the atmosphere when the arm is lifted while the annular space is being produced as the hermetically sealed chamber.

\* \* \* \* \*